US010725508B2

(12) United States Patent
Brown et al.

(10) Patent No.: US 10,725,508 B2
(45) Date of Patent: Jul. 28, 2020

(54) RESPONDING TO DATA BACKUP OPERATION

(71) Applicant: Hewlett Packard Enterprise Development LP, Houston, TX (US)

(72) Inventors: Andrew Brown, Houston, TX (US); Patrick Raymond, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 488 days.

(21) Appl. No.: 15/170,617

(22) Filed: Jun. 1, 2016

(65) Prior Publication Data

US 2017/0351448 A1    Dec. 7, 2017

(51) Int. Cl.
| G06F 1/20 | (2006.01) |
| G06F 1/26 | (2006.01) |
| G06F 1/3234 | (2019.01) |
| G06F 1/3206 | (2019.01) |
| G06F 11/14 | (2006.01) |

(52) U.S. Cl.
CPC .............. *G06F 1/206* (2013.01); *G06F 1/263* (2013.01); *G06F 1/325* (2013.01); *G06F 1/3206* (2013.01); *G06F 1/3234* (2013.01); *G06F 11/1441* (2013.01); *G06F 11/1456* (2013.01); *Y02D 10/16* (2018.01); *Y02D 50/20* (2018.01)

(58) Field of Classification Search
CPC ........ G06F 3/0625; G06F 1/206; G06F 1/263; G06F 3/0653; G06F 3/0619; G06F 3/068
USPC .................................................. 700/286–300
See application file for complete search history.

(56) References Cited

U.S. PATENT DOCUMENTS

| 7,721,125 B2 | 5/2010 | Fung |
| 8,868,957 B2 | 10/2014 | Davis et al. |
| 2003/0033348 A1* | 2/2003 | King ................. G06F 1/183 709/201 |
| 2003/0121642 A1* | 7/2003 | Thompson ............... H04L 1/22 165/80.2 |
| 2005/0171648 A1* | 8/2005 | Frankel .............. F04D 27/004 700/300 |
| 2006/0224907 A1* | 10/2006 | Feldman ................. G06F 1/28 713/300 |
| 2007/0033433 A1* | 2/2007 | Pecone ................ G06F 1/305 714/6.13 |
| 2008/0197808 A1* | 8/2008 | Banta ..................... E06B 9/56 320/134 |
| 2008/0201595 A1 | 8/2008 | Kawasaki |
| 2010/0164427 A1* | 7/2010 | Dishman .............. G06F 1/206 318/705 |

(Continued)

OTHER PUBLICATIONS

"Tailoring Server BIOS Settings for Cool Servers Without Wasting Energy", (Research Paper), Jul. 17, 2013, 5 pages.

*Primary Examiner* — Ziaul Karim
(74) *Attorney, Agent, or Firm* — Hewlett Packard Enterprise Patent Development

(57) ABSTRACT

Various examples described herein provide for causing operation of a cooling system of a computing device to be adjusted (e.g., reduced or disabled) during at least a portion of a backup operation, where data is copied from volatile memory of the computing device to non-volatile memory of the computing device. Some examples can be implemented with respect to a type 10 (T10) non-volatile dynamic inline memory module (NVDIMM) configuration.

16 Claims, 6 Drawing Sheets

(56) References Cited

U.S. PATENT DOCUMENTS

| | | | |
|---|---|---|---|
| 2013/0067137 A1* | 3/2013 | Molloy | G06F 1/3275 |
| | | | 711/103 |
| 2013/0080796 A1* | 3/2013 | Matsubara | G06F 1/206 |
| | | | 713/300 |
| 2014/0173299 A1 | 6/2014 | McKnight et al. | |
| 2014/0325116 A1* | 10/2014 | McKelvie | G06F 12/0246 |
| | | | 711/103 |
| 2015/0105910 A1 | 4/2015 | Zou | |
| 2015/0380985 A1* | 12/2015 | Lecourtier | H02J 7/0068 |
| | | | 713/300 |
| 2016/0154597 A1* | 6/2016 | McKelvie | G06F 3/067 |
| | | | 711/162 |
| 2017/0262344 A1* | 9/2017 | Shaw | G06F 11/1441 |

\* cited by examiner

RESPONDING TO DATA BACKUP OPERATION

BACKGROUND

In order to expedite data write, some persistent data storage systems utilize volatile memory (e.g., dynamic random access memory [RAM]) in addition to non-volatile memory (e.g., a hard disk drive [HDD] or solid-state drive [SSD], or flash memory) to facilitate date storage. For such persistent storage systems, when a computing device writes data, the persistent data storage system can write the data into the volatile memory of the computing device and then send an acknowledgement to the computing device that the data write is complete. As the volatile memory fills up, the persistent data storage system may flush the data in the volatile memory to non-volatile memory (e.g., included by the computing device) to provide persistent data storage of that data after the volatile memory is no longer powered (e.g., after the computing device is powered off or loses power). In the event of the computing device crash or suddenly losing power, the volatile memory can be powered by a backup power source (e.g., backup battery or capacitor) that temporarily powers the volatile memory (e.g., for minutes, hours, or days) while a data backup operation copies data from the volatile memory to the non-volatile memory for persistence storage.

The volatile memory and non-volatile memory may be included as parts of a "Type 1" (T1) architecture non-volatile dual in-line memory module (NVDIMM). A T1 NVDIMM is a dynamic random access memory (DRAM) DIMM that includes a set of NAND flash memory chips to provide non-volatile memory to retain data even during removal of power to the NVDIMM. Upon loss of its primary power supply, a controller on the T1 NVDIMM can facilitate copying data from its DRAM to its non-volatile memory, while being powered by a backup power source and without significant dependence on components external to the DIMM. As a backup power source, the T1 NVDIMM can include a small or micro uninterruptible power supply (UPS) that can provide a relatively short time of electricity if needed to backup data from the DRAM to the non-volatile memory.

BRIEF DESCRIPTION OF THE DRAWINGS

Certain examples are described in the following detailed description in reference to the following drawings.

DETAILED DESCRIPTION

Figure 1:
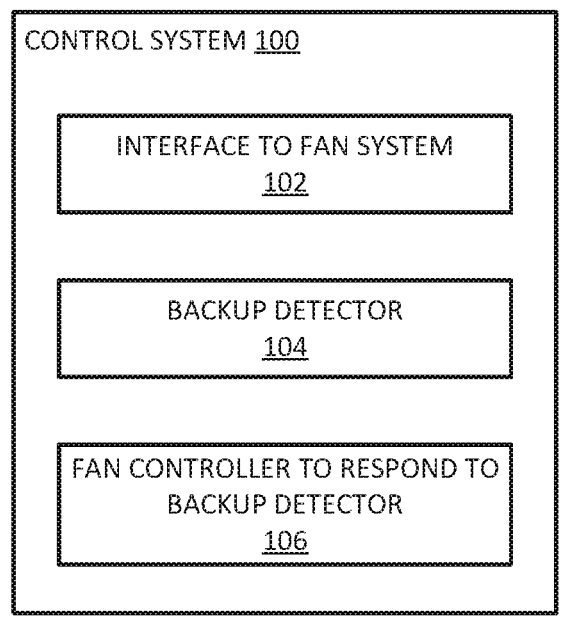
FIGS. 1 and 2 are block diagrams illustrating example control systems according to the present disclosure.

Various computing devices, such as servers, employ a "Type 10" (T10) architecture NVDIMM in a persistent data storage system. A T10 NVDIMM is generally implemented in a computing device by a standard a dynamic random access memory (DRAM) dual in-line memory module (DIMM), non-volatile memory and an uninterruptable power supply (UPS) internal to the computing device but external to the DIMM. Once copied to the non-volatile memory, data on the DRAM may be marked as persistently stored (e.g., preserved across surprise and intermittent power outages or certain internal failures) and can be treated as such by a software application operating on the computing device. The UPS can power the DIMM and the computing device such that in the event of a catastrophic error, the UPS can provide back power to the DIMM to allow data be copied from the DRAM to non-volatile memory of the computing device to achieve a data backup (i.e., T10 NVDIMM backup). As used herein, a catastrophic error can include, without limitation, removal of a primary power source (e.g., AC power) from the computing device, a power regulator going bad, catastrophic error on a data bus (e.g., PCI bus), a memory module error (e.g., double data rate [DDR] uncorrectable error), or an internal failure that causes shutdown of the computing device. Unlike a T1 NVDIMM, a T10 NVDIMM may rely on components external to the DIMM to facilitate copying data from the DRAM to the non-volatile memory external to the DIMM. For instance, a basic input/output operating system (BIOS) of the computing device of the computing device may the copy operation after a warm reset of the computing device. In certain instances, the internal UPS of the computing device provides the backup power to the DIMM and a cooling system (e.g., fan system or liquid cooling system) of the computing device during a T10 NVDIMM backup.

Various examples describe herein provide for a reduction (or elimination) of power usage from an internal UPS (or other backup power source) by a cooling system within a computing device during a T10 NVDIMM backup operation of DRAM within the computing device. In particular, upon detecting that a backup operation is being performed with respect to the DRAM of the computing device (e.g., detecting that the BIOS is in a backup operation mode instead of a normal boot), various examples can throttle operation of the cooling system (e.g., fan system or liquid cooling system) to reduce the cooling system's power consumption from the internal UPS when the UPS is providing backup power.

According to some examples, the cooling system is throttled by being placed in a standby or low power mode. Throttling the cooling system can include, for instance, disabling (e.g., turning off) any extraneous fans in a fan system to reduce the cooling system's power consumption during a backup operation under backup power. In another instance, a pertinent subsystem of the computer system is monitored (e.g., by a management processor) and throttling the cooling system comprises increasing the operation of the cooling system (e.g., the fan system) as necessary to ensure that the pertinent subsystem does not overheat. In some such instances, higher temperatures may be permitted for the pertinent subsystem (e.g., an application specific integrated circuit [ASIC]) for a predetermined period (e.g., 3 to 4 minutes) before it is necessary for the operation of the cooling system to be increased to counter the higher temperature. The predetermined period may be sufficient to permit a backup operation of the DRAM to take place, but short enough that the pertinent subsystem's temperature is not expected to rise from an ambient temperature to a new maximum temperature.

By way reducing power consumption by the cooling system, various examples enable the internal UPS to preserve more backup power for use by the DIMM during a backup operation of data stored on the DRAM of the DIMM. This in turn can permit the DIMM (and other components of the computing device) to be powered for longer by backup power from the internal UPS, thereby permitting more data to be copied from the DRAM to non-volatile memory of the computing device. This can also permit a computing device to employ a larger capacity DRAM DIMM in a T10 NVDIMM implementation, as more data can be ensured to be backed-up (made persistent) during the additional uptime provided to the DIMM by the backup powered from the UPS. This can permit a larger in-memory database to reside and operate from the volatile memory, with less risk of data loss, than was previously possible. In certain instances, operation of the cooling system during a backup operation can be adjusted such that backup power consumption from the internal USP is reduced by half when compared to previous cooling system management.

Various examples described herein can be implemented as an extension to cooling system (e.g., fan system) management that has traditionally existed in computing devices during operation. For some examples, the management processor (e.g., a baseboard management controller functioning as the cooling system manager) is responsible for throttling the cooling system. Additionally, for a computing device utilizing a T10 NVDIMM, a basic input/output operating system (BIOS) of the computing device can cause the copying of data from the DIMM to the non-volatile memory to achieve data backup (also referred to as a T10 NVDIMM backup. Some examples described herein are equally applicable to various NVDIMM configurations, similar to T10 NVDIMMs, which facilitate backup of data from volatile memory of a DIMM to the non-volatile memory external to the DIMM.

As used herein, a computing device can comprise a desktop, laptop, workstation, server (e.g., rack-mount server), a mobile device (e.g., smart phone), or other device that operates by a processor. A cooling system can include, without limitation, a fan system or a liquid cooling system. A backup power source can include, without limitation, a battery or a capacitor, which may be part of an uninterruptable power supply (UPS). Non-volatile memory can include, without limitation, a hard disk drive (HDD), a solid-state drive (SSD) (e.g., M.2 drive), persistent memory, non-volatile memory express (NVMe) drive, or a flash memory chip.

As used herein, a management processor of a computing device can include a hardware processor dedicated to management of the computing device, and that can execute in a separate or isolated manner from the main processor (e.g., central processing unit [CPU]) of the computing system. An example of a management processor can include a baseboard management controller (BMC), which is a specialized microcontroller embedded on a motherboard of a computing device such as a server. A BMC can support the Intelligent Platform Management Interface (IPMI) architecture, which defines a set of common interfaces to computer hardware and firmware that system administrators can use to monitor health and manage a computing device. A BMC can manage the interface between system management software and hardware of the computing device. A BMC of a computing device can provide remote management access to the computing device, and may provide such remote management access over an out-of-band communication channel, which isolates management communication from communication of an operating system (OS) running on the computing device. In some instances, the BMC may enable lights-out management of the computing device, which provides remote management access (e.g., system console access) to the computing device regardless of whether the computing device is powered on, whether a primary network subsystem hardware is functioning, or whether an OS is operating or even installed.

As also used herein, components of various examples (e.g., system components) may comprise, in whole or in part, computer-readable instructions or electronic circuitry. For instance, a component may comprise computer-readable instructions executable by a processor to perform one or more functions in accordance with various examples described herein. Likewise, in another instance, a component may comprise electronic circuitry to perform one or more functions in accordance with various examples described herein. The elements of a component may be combined in a single package, maintained in several packages, or maintained separately.

The following provides a detailed description of examples illustrated by FIGS. 1-6.

FIG. 1 is a block diagram illustrating an example control system 100 according to the present disclosure. For some examples, the control system 100 is included as part of a computing device, such as a desktop or a server. Additionally, for some examples, some or all of the control system 100 is implemented by a management processor (e.g., BMC) of a computing device. As shown in FIG. 1, the control system 100 includes an interface 102 to couple to a fan system of a computing device, a backup detector 104, and a fan controller 106 to respond to the backup detector 104. In various examples, the components or the arrangement of components in the control system 100 may differ from what is depicted in FIG. 1.

The interface 102 can couple to a fan system of a computing device that includes the control system 100. Depending on the example, the fan system may be one that includes a set of fans, and through the interface 102, the control system 100 can control operation of a subset of fans (e.g., at least one fan) in the set of fans. For instance, through the interface 102, the control system 100 can disable (e.g., halt) operation of at least one fan (e.g., render it idle), can adjust a speed of the at least one fan (e.g., signal the desired revolutions per a minute [RPM]), or can set an operational mode (e.g., a low or minimum power mode, a high power mode, etc.) of the at least one fan. Additionally, through the interface 102, the control system 100 may determine a current operational status of the at least one fan (e.g., current RPM) or can determine current power consumption by the at least one fan. For some examples, the control system 100 is included by a management processor of the computing device, and the management processor controls operation of a fan system using a pulse-width modulation (PWM) signal. For some such examples, the fan may be directly coupled to the management processor via a set of connections disposed on a printed circuit board (PCB).

The backup detector 104 can detect an execution of a backup operation where data from volatile memory of a computing device is copied to non-volatile memory of the computing device while the volatile memory, the non-volatile memory, and a fan system of the computing device are being powered by a backup power source. For some examples, a basic input/output (BIOS) of the computing device commences the backup operation, and may do so after a catastrophic error (e.g., hardware error) that results in a warm reset of the computing device. In particular, an integrated circuit (e.g., programmable logic device [PLD] or a complex PLD [CPLD]) of the computing device may detect the catastrophic error and generate a system management interrupt (SMI) into the BIOS, which causes the BIOS initiates a warm reset and enters into a backup operation mode (versus a normal boot mode). During the backup operation mode, the BIOS facilitates copying data from the volatile memory is copied to the non-volatile memory to back-up the data and ensure data persistence. For some examples, the data is copied from the volatile memory to the non-volatile memory via a central processing unit (CPU) of the computing device or a direct memory access (DMA) engine of the computing device. Subsequent to the backup operation, the BIOS may permit the computing device to power down. According to various examples, the backup detector 104 detects execution of the backup operation by detecting whether the BIOS is in a backup operation mode.

In response to the backup detector 104 detecting execution of the backup operation, the fan controller 106 can cause, via the interface 102, at least one fan of the fan system (of the computing device) to be disabled (e.g., standby mode) or to operate at a low fan speed during at least a portion of the execution of the backup operation. As noted herein, by disabling or placing at least one fan of the fan system at a low fan speed, power temporarily being provided by the backup power source can be preserved during the backup operation, and the preserved power can be utilized in copying more data from the volatile memory to the non-volatile memory during the backup operation. The one fan that is disabled or placed at a low fan speed may be an extraneous one not necessarily utilized during the backup operation, or one that does not necessarily need to be cooled for the short period of time (e.g., 3 or 4 minutes) during which the backup operation is performed. Such an extraneous fan could include, for instance, one intended to cool a network controller, a central processing unit (CPU), a graphics processing unit (GPU), a south bridge application specific integrated circuit (ASIC), or a computing device chassis fan (e.g., mounted at the front, back, top or bottom of the chassis).

Figure 2:
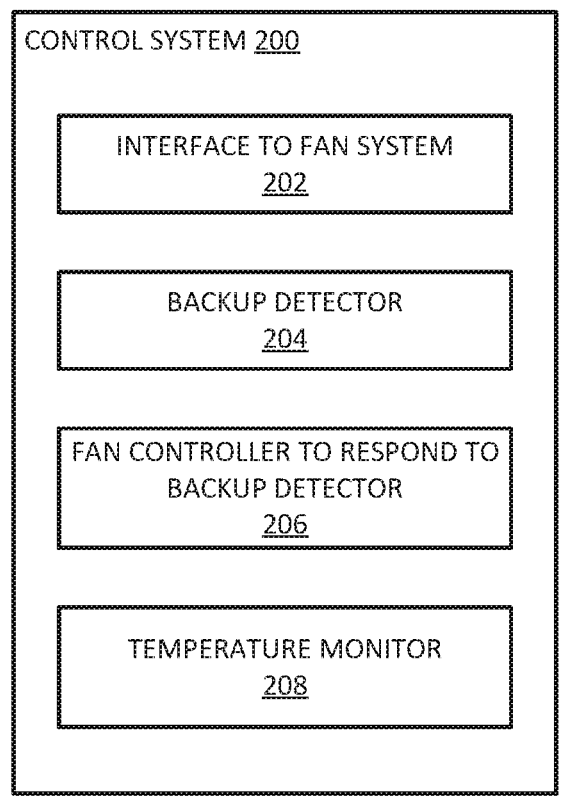

FIG. 2 is a block diagram illustrating an example control system 200 according to the present disclosure. Similar to FIG. 1, the control system 200 may be included as part of a computing device, such as a desktop or a server. Additionally, some or all of the control system 200 may be implemented by a management processor (e.g., BMC) of a computing device. In FIG. 2, the control system 200 includes an interface 202 to couple to a fan system of a computing device, a backup detector 204, a fan controller 206 to respond to the backup detector 204, and a temperature monitor 208. In various examples, the components or the arrangement of components in the control system 200 may differ from what is depicted in FIG. 2.

For some examples, the interface 202, the backup detector 204, and the fan controller 206 are respectively similar to the interface 102, the backup detector 104, and the fan controller 106 of the control system 100 described above with respect to FIG. 1.

The temperature monitor 208 can determine whether a temperature of a component of the computing device exceeds a temperature threshold, associated with the component, during (some or all of) the execution of the backup operation. Depending on the example, the temperature monitor 208 may obtain a temperature reading from a temperature sensor externally coupled to the component, or a temperature sensor included by (e.g., integrated into) the component. The component may include, without limitation, an integrated circuit (e.g., an application specific integrated circuit [ASIC]), a computing device peripheral (e.g., PCI adapter), a processor (e.g., a central processing unit or a management processor), memory module (e.g., DIMM), or a data storage device (e.g., hard disk drive or solid-state drive). The component may include a subsystem of the computing device pertinent for copying data from the volatile memory of the computing device to the non-volatile memory during the backup operation described herein.

According to some examples, when the temperature monitor 208 determines that a temperature of a component of the computing device exceeds a temperature threshold, the fan controller 206 responds to the determination by causing the at least one fan to be enabled (if previously disabled by the fan controller 206) or to operate at an alternate fan speed (if previously set to a low fan speed by the fan controller 206). The temperature threshold associated with the component may be one that represents a limit to the operational temperature range of the component. For instance, the temperature threshold may comprise the highest operation temperature of the component before the component begins to malfunction or suffer physical damage. The at least one fan may be one associated with cooling the component (e.g., one coupled to the component). Additionally, the alternative speed may be one that is higher than the low fan speed that may have previously been caused (e.g., set) by the fan controller 206. The alternative fan speed may comprise a fan speed that is dynamically adjusted (e.g., by the management processor) as necessary to appropriately cool the component.

By way of the fan controller 206 and the temperature monitor 208, the control system 200 can reduce consumption of backup power by the at least one fan, and permit the component to operate at a higher operational temperature than usual, for at least a known period of time. During that period of time, if the temperature of the component exceeds the temperature threshold associated with the component (e.g., acceptable operating temperature), the fan controller 206 can cause the at least one fan to be enabled or to operate at the alternative fan speed, thereby resulting in a reduction of the operating temperature of the component.

Figure 3:
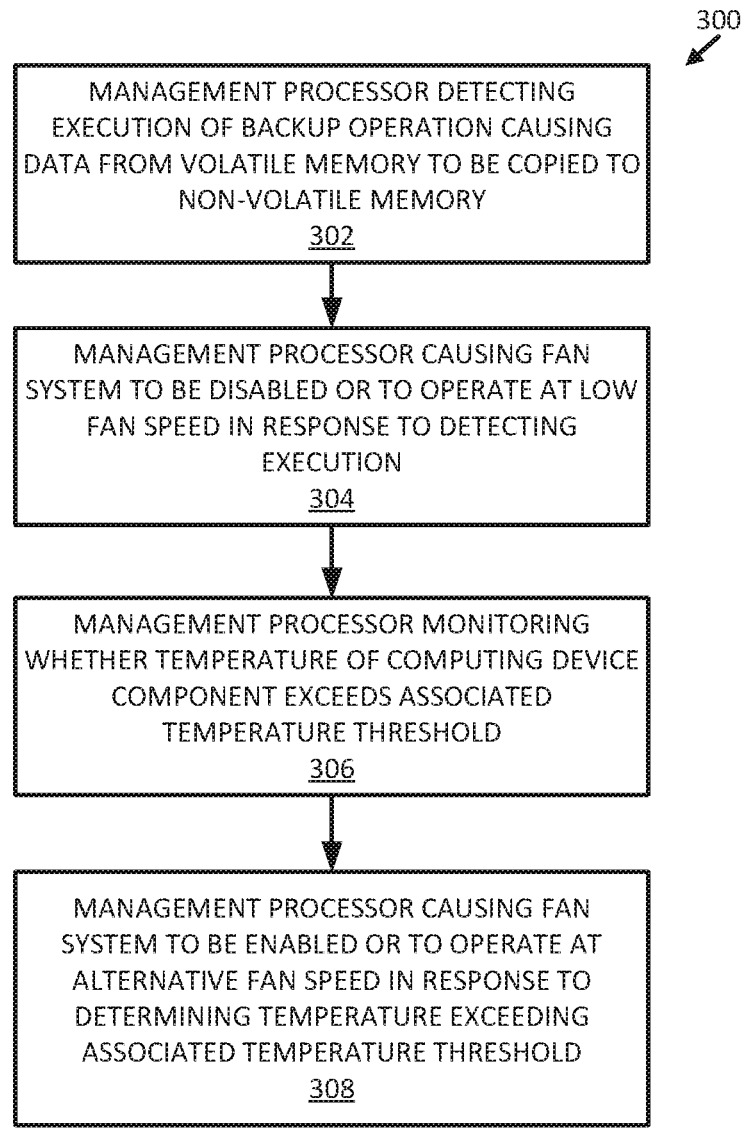
FIGS. 3 and 4 are flow diagrams illustrating example methods for controlling a fan system according to the present disclosure.

FIG. 3 is a flow diagram illustrating an example method 300 for controlling a fan system according to the present disclosure. In particular, the method 300 may be performed, at last in part, by a management processor of a computing device, such as a baseboard management controller (BMC). Although execution of the method 300 is described below with reference to a management processor, execution of the method 300 by other suitable systems or devices may be possible. The method 300 can be implemented in the form of executable instructions stored on a computer-readable medium or in the form of electronic circuitry.

In FIG. 3, the method 300 may begin at block 302, with a management processor of a computing device detecting an execution of a backup operation that causes data from volatile memory of the computing device to be copied to non-volatile memory of the computing device. As noted herein, the backup operation may execute while the volatile memory, the non-volatile memory, and a fan system of the computing device are being powered by a backup power source. As also noted herein, the backup power source may be one internally included by the computing device. In response to detecting the execution of the backup operation at block 302, the method 300 may continue to block 304, with the management processor causing at least one fan of the fan system to be disabled or to operate at a low fan speed during at least a portion of the execution.

Subsequently, the method 300 may continue to block 306, with the management processor monitoring whether a temperature of a component of the computing device exceeds a temperature threshold associated with the component. In response to the determining that the temperature exceeds the temperature threshold at block 306, the method 300 may continue to block 308, with the management processor causing the at least one fan to be enabled (if previously disabled) or to operate at an alternative fan speed (if previously set to a low fan speed).

Figure 4:
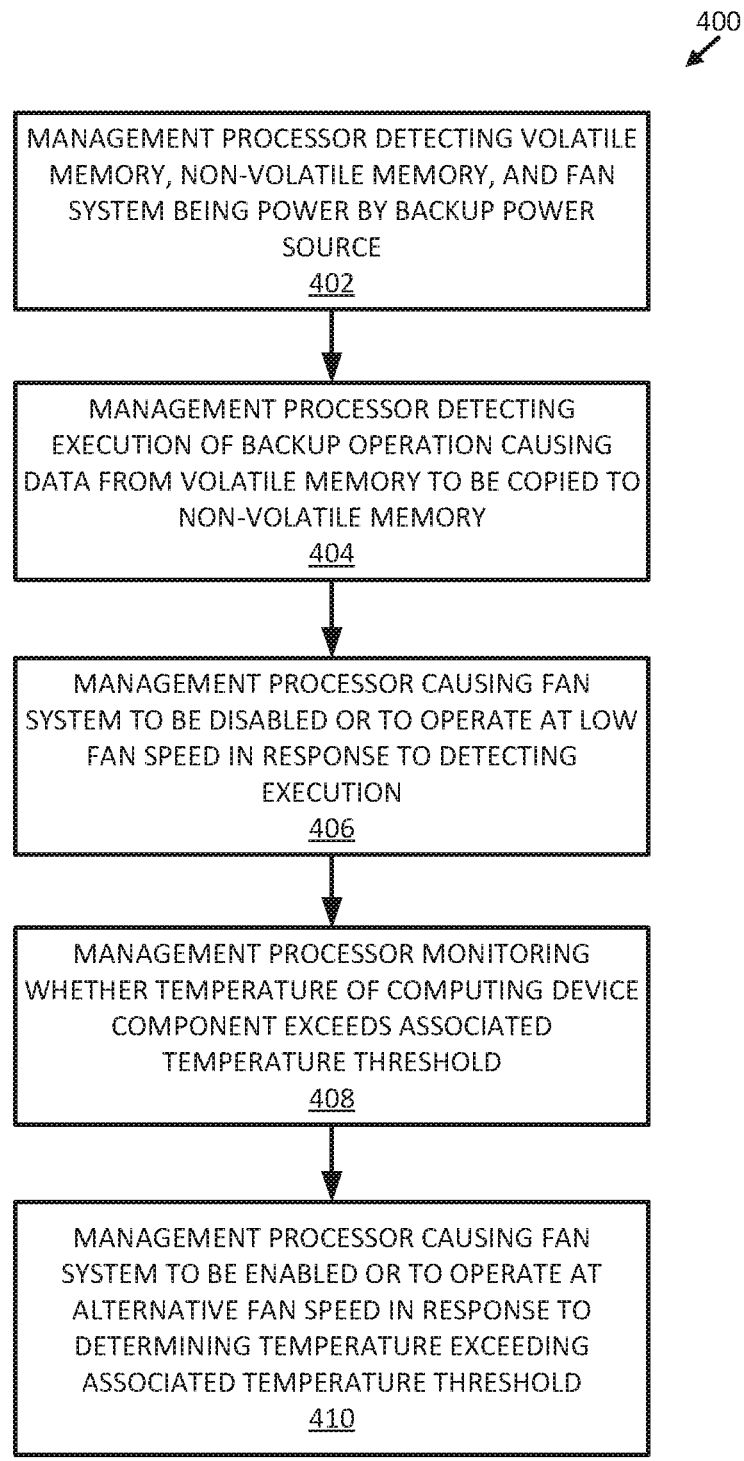

FIG. 4 is a flow diagram illustrating an example method 400 for controlling a fan system according to the present disclosure. Similar to the method 300 of FIG. 3, the method 400 may be performed, at last in part, by a management processor of a computing device, such as a baseboard management controller (BMC). Although execution of the method 400 is described below with reference to a management processor, execution of the method 400 by other suitable systems or devices may be possible. The method 400 can be implemented in the form of executable instructions stored on a computer-readable medium or in the form of electronic circuitry.

In FIG. 4, the method 400 may begin at block 402, with a management processor of a computing device detecting that a volatile memory of a computing device, a non-volatile memory of the computing device, and a fan system of the computing device are being powered by a backup power source. The method 400 may continue to blocks 404, 406, 408, and 410, which may be similar to blocks 302, 304, 306, and 308 of the method 300 as described above with respect to FIG. 3.

Figure 5:
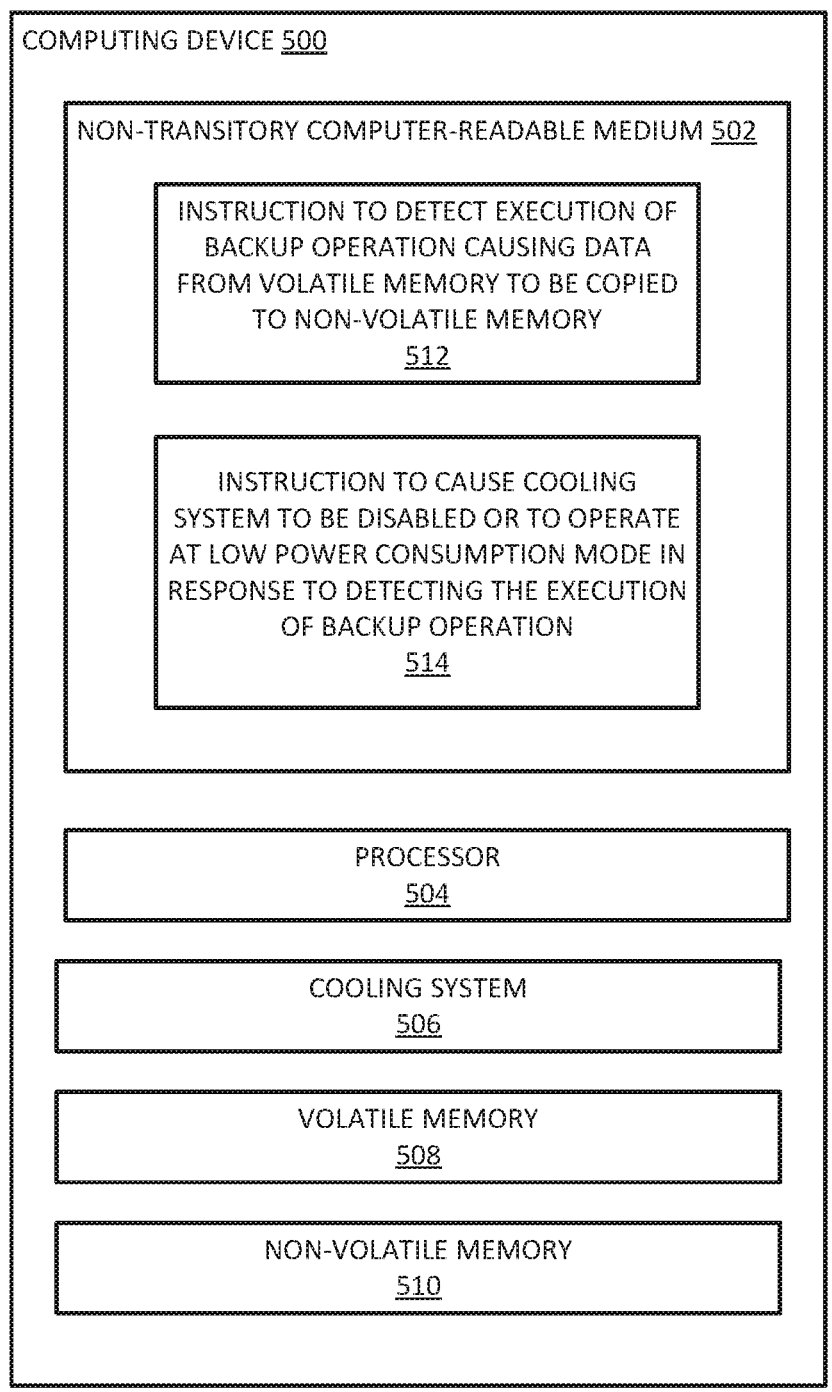
FIGS. 5 and 6 are block diagrams illustrating example computing devices including instructions for controlling a cooling system according to the present disclosure.

FIG. 5 is a block diagram illustrating an example computing device 500 including instructions for controlling a cooling system 506 according to the present disclosure. As shown, the computing device 500 includes a non-transitory computer-readable medium 502, a processor 504, the cooling system 506, volatile memory, and non-volatile memory 510. Though not illustrated, the computing device 500 may internally include a backup power source that can provide backup power to the cooling system 506, the volatile memory 508, the non-volatile memory 510, or some combination thereof. Such a backup power source can provide backup power to these components when necessary, such as in the event the computing device suffers a catastrophic event (e.g., one that results in the computing device 500 unexpectedly losing its primary power source or requiring shutdown). For some examples, the backup power source is external to the computing device 500 and coupled to the computing device 500. Depending on the example, the computing device 500 may be a desktop, a server, a laptop, or a tablet. Additionally, for some examples, the computing device 500 may include a management processor (not shown). In various examples, the components or the arrangement of components of the computing device 500 may differ from what is depicted in FIG. 5. For instance, the computing device 500 can include more or less components than those depicted in FIG. 5.

The non-transitory computer-readable medium 502 may be any electronic, magnetic, optical, or other physical storage device that stores executable instructions. For example, the non-transitory computer-readable medium 502 may be a Random Access Memory (RAM), an Electrically-Erasable Programmable Read-Only Memory (EEPROM), a storage drive, an optical disc, or the like. The non-transitory computer-readable medium 502 can be encoded to store executable instructions that cause the processor 504 to perform operations in accordance with various examples described herein. In various examples, the non-transitory computer-readable medium 502 is non-transitory. As shown in FIG. 5, the non-transitory computer-readable medium 502 includes: an instruction 512 to detect execution of a backup operation causing data from the volatile memory 508 to be copied to the non-volatile memory 510; and an instruction 514 to cause the cooling system 506 to be disabled (e.g., halted) or to operate at a low power consumption mode in response to detecting execution of the backup operation by the instruction 512.

The processor 504 may be one or more central processing units (CPUs), microprocessors, or other hardware devices suitable for retrieval and execution of one or more instructions stored in the non-transitory computer-readable medium 502. For some examples, the processor 504 is included by a management processor (not shown) of the computing device 500, and such a management processor may include the non-transitory computer-readable medium 502 that causes the processor 504 to operations described herein. The processor 504 may fetch, decode, and execute the instructions 512 and 514 to enable the computing device 500 to perform operations in accordance with various examples described herein. For some examples, the processor 504 includes one or more electronic circuits comprising a number of electronic components for performing the functionality of one or more of the instructions 512 and 514.

The instruction 512 can instruct the processor 504 to detect execution of a backup operation that causes data from the volatile memory 508 to be copied to the non-volatile memory 510, and that executes while the volatile memory 508, the non-volatile memory 510, and the cooling system 506 are being powered by a backup power source. For some examples, the volatile memory 508 and the non-volatile memory 510 implement a T10 NVDIMM configuration within the computing device 500. The instruction 514 can instruct the processor 504 to cause the cooling system 506 to be disabled or to operate at a low power consumption mode in response to detecting execution of the backup operation by the instruction 512.

The cooling system 506 can comprise, for example, a fan system, a liquid cooling system (e.g., water cooling system), phase-change system, or the like. The cooling system 506 may include a management component that permits adjustments to its operation by the processor 504. For some examples, a management processor of the computing device 500 may directly manage operation of the cooling system 506. For instance, an individual fan of a fan system may be coupled to the processor 504, which controls (and possibly powers) operation of the fan using a pulse-width modulation (PWM) signal.

The volatile memory 508 can comprise, for example, dynamic random access memory (DRAM), which may be included as part of a modular memory module, such as a dual-inline memory module (DIMM). The non-volatile memory 510 can comprise, for example, a hard disk drive (HDD), a solid-state drive (SSD), or a flash memory chip. Depending on the example, the non-volatile memory 510 and the volatile memory 508 may be included as part of the same module memory module.

Figure 6:
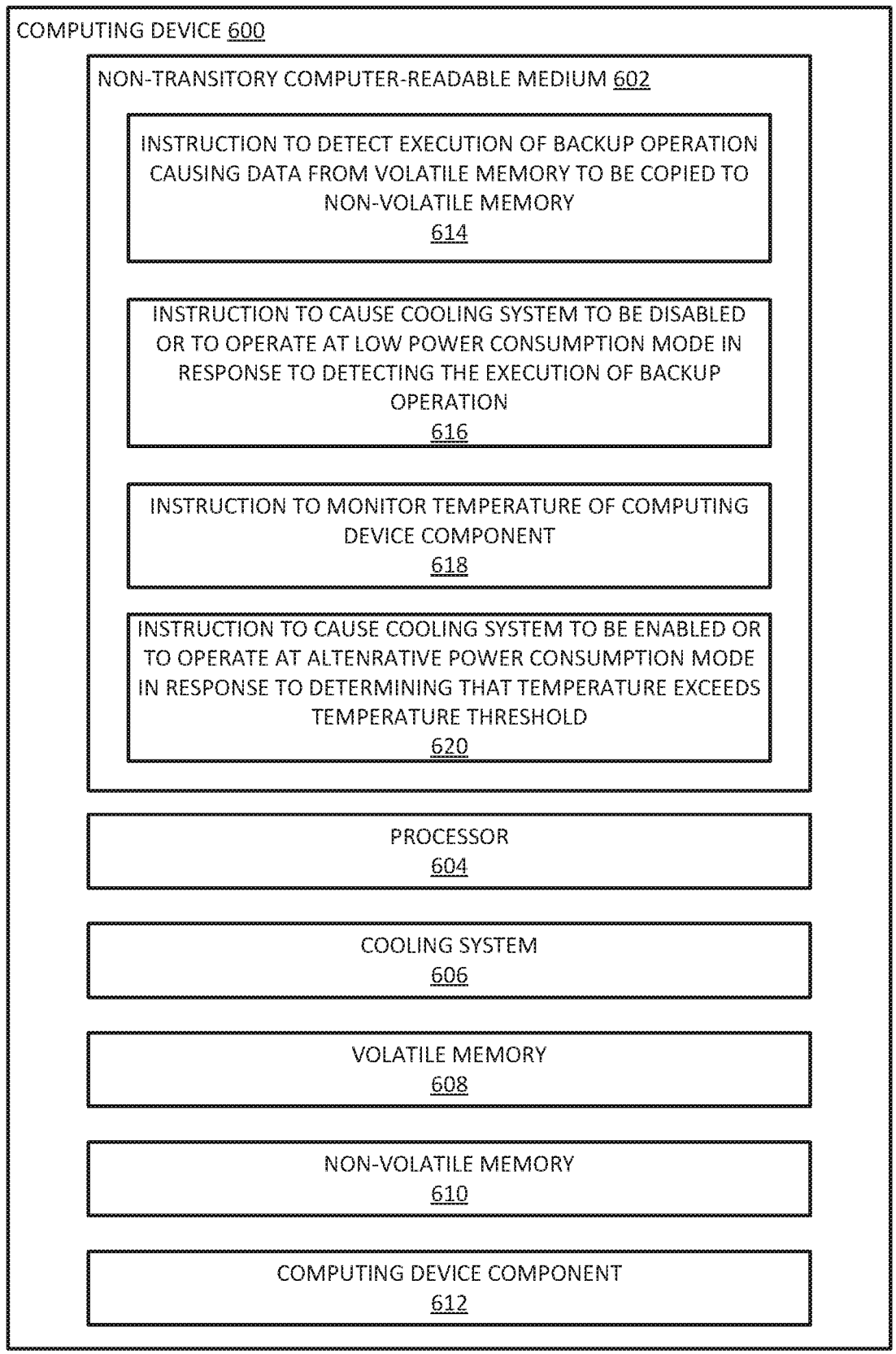

FIG. 6 is a block diagram illustrating an example computing device 600 including instructions for controlling a cooling system 606 according to the present disclosure. As shown, the computing device 600 includes a non-transitory computer-readable medium 602, a processor 604, the cooling system 606, volatile memory, non-volatile memory 610, and a computing device component 612. Though not illustrated, the computing device 600 may internally include a backup power source that can provide backup power to the cooling system 606, the volatile memory 608, the non-volatile memory 610, or some combination thereof. Such a backup power source can provide backup power to these components when necessary, such as in the event the computing device suffers a catastrophic event (e.g., one that results in the computing device 600 unexpectedly losing its primary power source or requiring shutdown). For some examples, the backup power source is external to the computing device 600 and coupled to the computing device 600. Depending on the example, the computing device 600 may be a desktop, a server, a laptop, or a tablet Additionally, for some examples, the computing device 600 may include a management processor (not shown). In various examples, the components or the arrangement of components of the computing device 600 may differ from what is depicted in FIG. 6. For instance, the computing device 600 can include more or less components than those depicted in FIG. 6.

For some examples, the non-transitory computer-readable medium 602, the processor 604, the cooling system 606, the volatile memory 608, and the non-volatile memory 610 are respectively similar to the non-transitory computer-readable medium 502, the processor 504, the cooling system 506, the volatile memory 508, and the non-volatile memory 510.

As shown in FIG. 6, the non-transitory computer-readable medium 602 includes: an instruction 614 to detect execution of a backup operation causing data from the volatile memory 608 to be copied to the non-volatile memory 610; an instruction 616 to cause the cooling system 606 to be disabled (e.g., halted) or to operate at a low power consumption mode in response to detecting execution of the backup operation by the instruction 614; an instruction 618 to monitor a temperature of the computing device component 612; and an instruction 620 to cause the cooling system 606 to be enabled or to operate at an alternative power consumption mode in response to the determination by instruction 618. For some examples, instructions 614 and 616 are similar to instructions 512 and 514 described above with respect to FIG. 5.

The instruction 618 can instruct the processor 604 to monitor the temperature of the computing device component 612. As noted herein, the processor 604 can obtain the temperature from a temperature sensor coupled to the computing device component 612, or included by the computing device component 612. In response to the temperature exceeding a temperature threshold associated with the computing device component 612, the instruction 620 can instruct the processor 604 to cause the cooling system 606 to be enabled (if previously disable by instruction 616) or to operate at an alternative power consumption mode (if previously set to an low power consumption mode by instruction 616) in response to the determination by instruction 618.

As noted herein, the computing device component 612 may include, without limitation, an integrated circuit (e.g., an application specific integrated circuit [ASIC]), a computing device peripheral (e.g., PCI adapter), a processor (e.g., a central processing unit or a management processor), memory module (e.g., DIMM), or a data storage device (e.g., hard disk drive or solid-state drive). Additionally, the component may include a subsystem of the computing device 600 pertinent for copying data from the volatile memory 608 of the computing device to the non-volatile memory 610 during the backup operation described herein.

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

The invention claimed is:

1. A control system, comprising:
an interface to couple the control system to a fan system of a computing device, the computing device including a volatile memory, a non-volatile memory, and a fan system;
a backup detector to detect, in response to a reset of the computing device, whether or not firmware of the computing device is in a boot mode in which the firmware causes the computing device to perform a backup operation, wherein, in the boot mode, the firmware causing data from the volatile memory to be copied to the non-volatile memory while the volatile memory, the non-volatile memory, and the fan system are being powered by a backup power source; and
a fan controller to respond to the backup detector detecting the firmware of the computing device being in the boot mode and a temperature monitor determining that a temperature exceeds a temperature threshold by causing, via the interface, at least one fan of the fan system to be enabled or to operate at an alternative fan speed higher than a low fan speed during at least a portion of an execution of the backup operation.

2. The control system of claim 1, wherein the temperature comprises a temperature of a component of the computing device, and the temperature threshold is associated with the component.

3. The control system of claim 1, wherein the firmware comprises a basic input/output (BIOS).

4. The control system of claim 1, wherein the reset comprises a warm reset.

5. The control system of claim 1, wherein the computing device further comprises a non-volatile dynamic inline memory module (NVDIMM), and the NVDIMM comprises the volatile memory.

6. The control system of claim 5, wherein the NVDIMM further comprises the non-volatile memory.

7. The control system of claim 1, wherein the computing device internally includes the backup power source.

8. The control system of claim 1, wherein:
the computing device comprises a first processor to execute the firmware; and
the backup detector comprises a management processor other than the first processor.

9. The control system of claim 8, wherein the management processor comprises a baseboard management controller.

10. A method, comprising:
a management processor of a computing device detecting, in response to a reset of the computing device, whether or not firmware of the computing device is in a boot mode in which the firmware causes the computing device to perform a backup operation, wherein, in the boot mode, the firmware causing data from volatile memory of the computing device to be copied to a non-volatile memory of the computing device while the volatile memory, the non-volatile memory, and a fan system of the computing device are being powered by a backup power source;
the management processor monitoring whether a temperature of a component of the computing device exceeds a temperature threshold associated with the component; and
in response to detecting the firmware of the computing device being in the boot mode and the management processor determining that the temperature exceeds the temperature threshold, the management processor causing at least one fan of the fan system to be enabled or to operate at an alternative fan speed higher than a low fan speed during at least a portion of an execution of the backup operation.

11. The method of claim 10, further comprising detecting that the volatile memory, the non-volatile memory, and the fan system are being powered by the backup power source.

12. The method of claim 10, wherein the firmware comprises a basic input/output (BIOS).

13. The method of claim 10, wherein the reset comprises a warm reset.

14. The method of claim 10, wherein a non-volatile dynamic inline memory module (NVDIMM) comprises the volatile memory.

15. The method of claim 14, wherein the NVDIMM further comprises the non-volatile memory.

16. The method of claim 10, wherein the computing device internally includes the backup power source.

\* \* \* \* \*